(12) United States Patent
Guiassa

(10) Patent No.: US 11,789,424 B2
(45) Date of Patent: Oct. 17, 2023

(54) METHOD AND SYSTEM FOR MANUFACTURING A PART

(71) Applicant: PRATT & WHITNEY CANADA CORP., Longueuil (CA)

(72) Inventor: Rachid Guiassa, Saint-Léonard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 558 days.

(21) Appl. No.: 17/066,932

(22) Filed: Oct. 9, 2020

(65) Prior Publication Data

US 2022/0111479 A1    Apr. 14, 2022

(51) Int. Cl.
*G05B 19/401* (2006.01)
*B23Q 17/20* (2006.01)
*G01B 21/04* (2006.01)
*G01B 5/012* (2006.01)

(52) U.S. Cl.
CPC ......... *G05B 19/4015* (2013.01); *B23Q 17/20* (2013.01); *G01B 21/042* (2013.01); *B23Q 2717/006* (2013.01); *G01B 5/012* (2013.01); *G05B 2219/50031* (2013.01); *G05B 2219/50252* (2013.01)

(58) Field of Classification Search
None
See application file for complete search history.

(56) References Cited

U.S. PATENT DOCUMENTS 4,816,729 A    3/1989   Carlson
10,401,162 B2  9/2019   Lummes et al.

*Primary Examiner* — Sean Shechtman
(74) *Attorney, Agent, or Firm* — Alexandre Daoust; Norton Rose Fulbright Canada LLP

(57) ABSTRACT

There is described a system for manufacturing a part. The system generally has a receiving area receiving said part, a first reference gauge and a second reference gauge which are subjected to common environmental conditions, said first reference gauge having a first nominal dimension and said second reference gauge having a second nominal dimension different from said first nominal dimension; a measurement device measuring dimensions of said first and second reference gauges, and measuring dimensions of said part; and a controller communicatively coupled to said measurement device, said controller determining a calibration curve by performing a mathematical fit based on said first and second nominal dimensions and said measured dimensions of said first and second reference gauges; and constructing a machine-readable dataset representative of said part, including modifying said measured dimensions of said part based on said calibration curve.

20 Claims, 10 Drawing Sheets

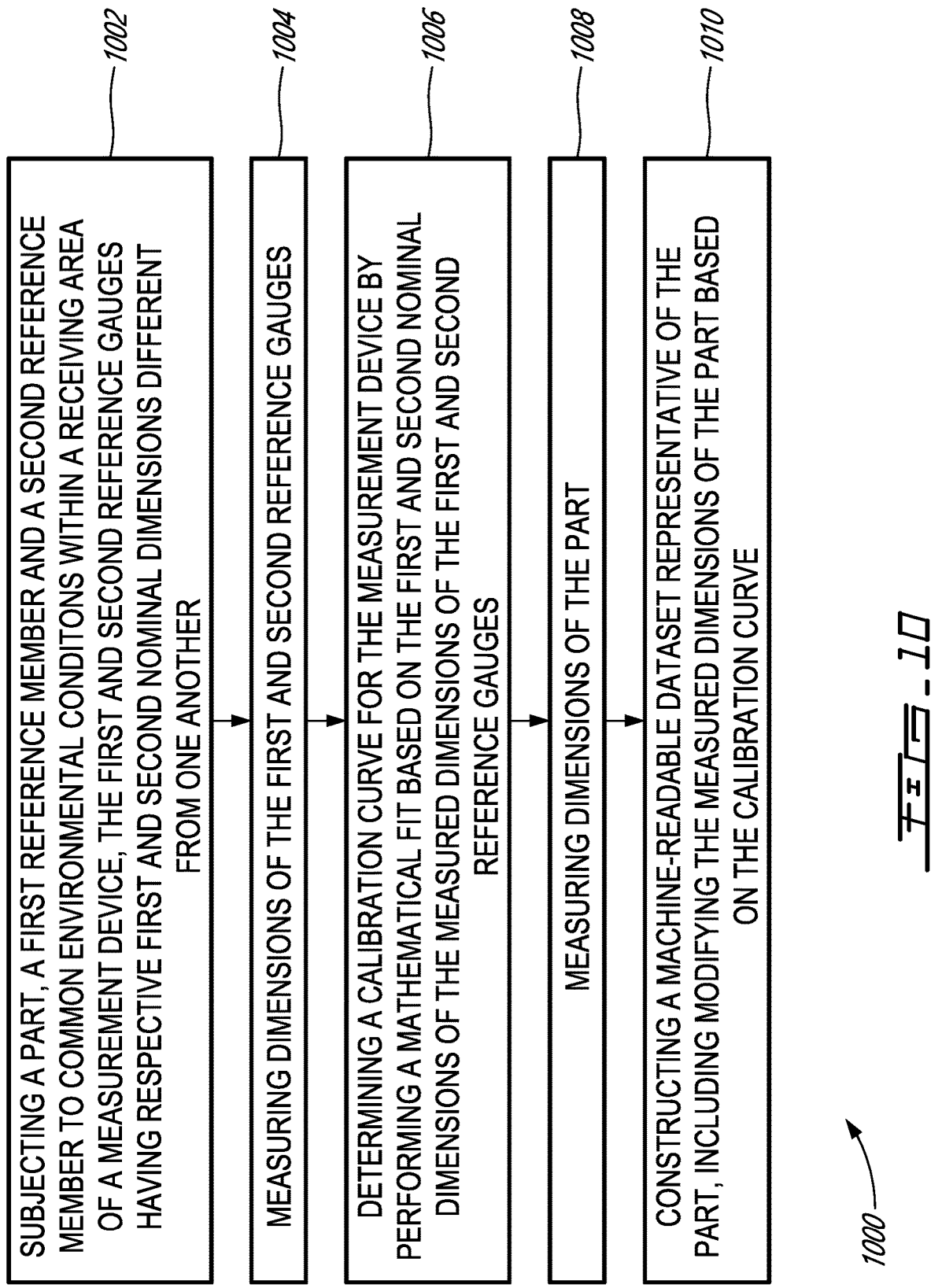

METHOD AND SYSTEM FOR MANUFACTURING A PART

TECHNICAL FIELD

The application relates generally to part manufacturing and, more particularly, to aircraft part manufacturing.

BACKGROUND OF THE ART

Some aircraft parts are manufactured using computer numerical control (CNC) machining systems. CNC machining systems implement specific sets of instructions using machining tools, three-dimensional printers and the like to manufacture aircraft parts according to tight tolerances. As minute environmental change can cause dimensional variability in the machining process, meeting tight tolerances can be challenging. There thus remains room for improvement.

SUMMARY

In one aspect, there is provided a system for manufacturing a part, the system comprising: a receiving area receiving said part, a first reference gauge and a second reference gauge and subjected to common environmental conditions, said first reference gauge having a first nominal dimension and said second reference gauge having a second nominal dimension different from said first nominal dimension; a measurement device operable to measure dimensions of said first and second reference gauges, and of said part; and a controller communicatively coupled to said measurement device, said controller having a processor and a non-transitory memory communicatively coupled to said processor and having stored thereon instructions that when executed by said processor while said part is received in said receiving area cause said controller and said measurement device to interoperate to: determine, by said measurement device, said dimensions of said first and second reference gauges, and of said part; determine, by said controller based on said dimensions of said first and second reference gauges, and of said first and second nominal dimensions, a calibration curve by performing a mathematical fit based on said first and second nominal dimensions and said measured dimensions of said first and second reference gauges; and construct, by said controller in said non-transitory memory, a machine-readable dataset representative of said part, including modifying, by said controller, said measured dimensions of said part based on said calibration curve.

In another aspect, there is provided a method of manufacturing a part, the method comprising: subjecting said part, a first reference gauge and a second reference gauge to common environmental conditions within a receiving area, said first reference gauge having a first nominal dimension and said second reference gauge having a second nominal dimension different from said first nominal dimension; using a measurement device, measuring dimensions of said first and second reference gauges, and measuring dimensions of said part; and using a controller communicatively coupled to said measurement device, receiving, from said measurement device, said measured dimensions of said part and of said first and second reference gauges, determining a calibration curve by performing a mathematical fit based on said first and second nominal dimensions and said measured dimensions of said first and second reference gauges; and constructing a machine-readable dataset representative of said part, including modifying said measured dimensions of said part based on said calibration curve.

DESCRIPTION OF THE DRAWINGS

Reference is now made to the accompanying figures in which:

FIG. 10 is a flow chart of a method of manufacturing an aircraft part using a system for manufacturing a part, in accordance with one or more embodiments.

DETAILED DESCRIPTION

Figure 1:
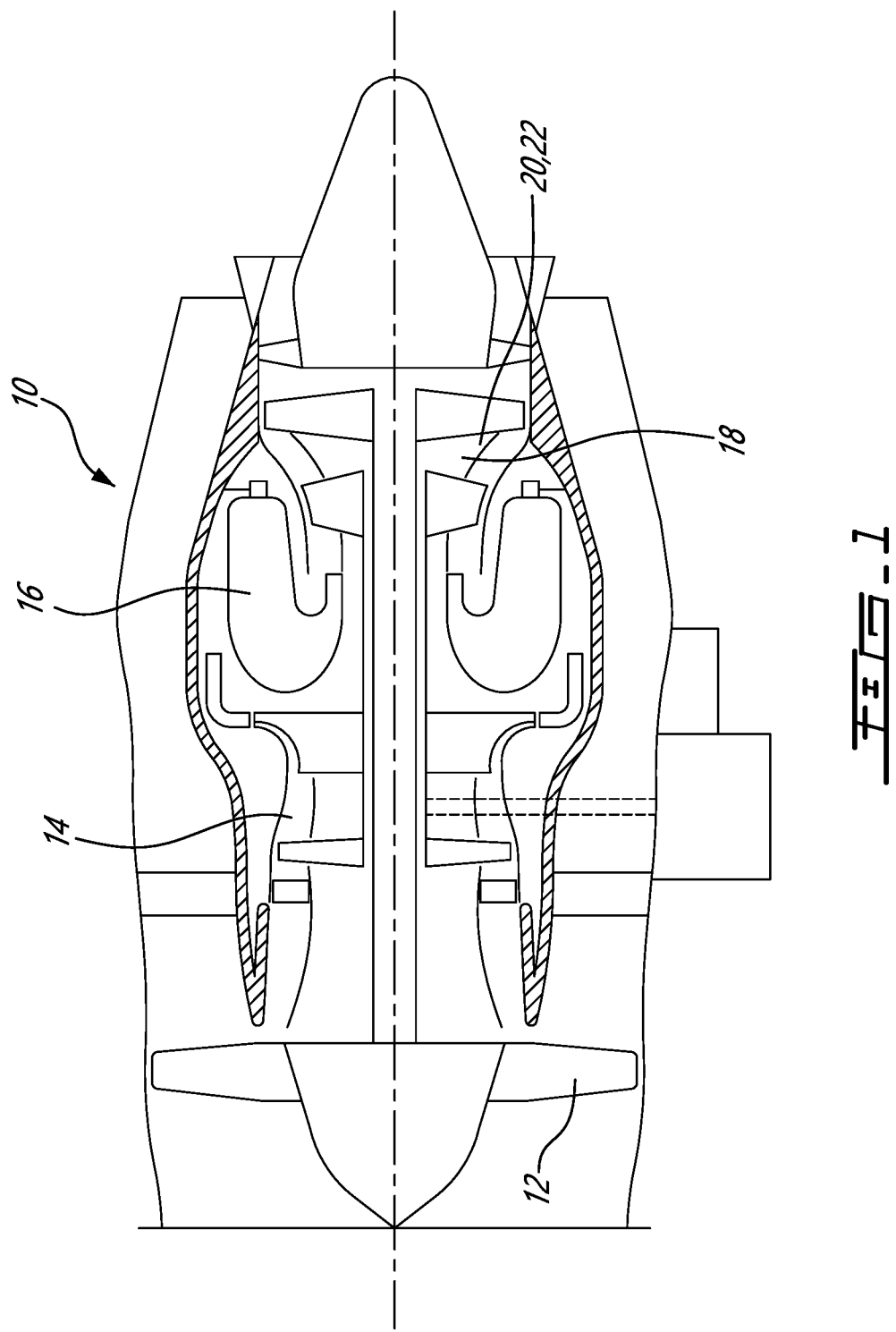
FIG. 1 is a schematic cross-sectional view of a gas turbine engine, in accordance with one or more embodiments.

FIG. 1 illustrates an aircraft gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. As depicted, the gas turbine engine 10 has a number of aircraft parts 20 such as turbine discs 22 that are manufactured according to tight tolerances. An example of such a tight tolerance may be up to about ±0.001 inch, preferably ±0.0001 inch or most preferably ±0.00001 inch or below for some aircraft parts. The machining of such parts can be performed using machining systems such as CNC machining systems for example. In some cases, to meet the tight tolerances, it can be desired to calibrate the CNC machining system using measurements taken during the machining process. Such a calibration process can be performed once prior to the manufacture of an aircraft part, or several times during the manufacture of the aircraft part, depending on the embodiment.

Figure 2:
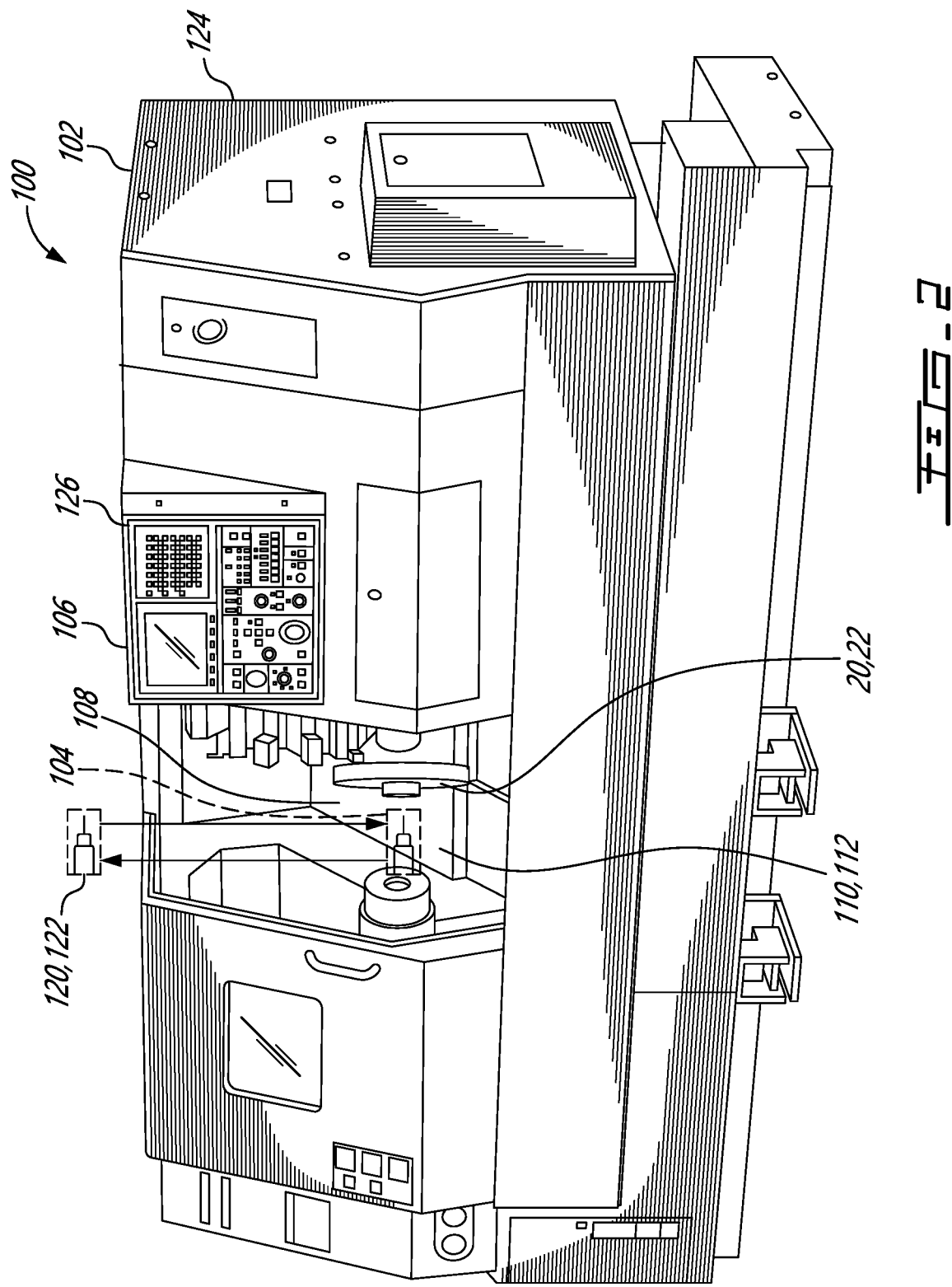
FIG. 2 is an oblique view of an example of a system for manufacturing an aircraft part, showing a measurement device and a controller, in accordance with one or more embodiments.

FIG. 2 shows an example of a manufacturing system 100 for manufacturing one or more aircraft parts 20 such as the turbine discs 22. As shown in this example, the manufacturing system 100 is part of a CNC machining system 102.

The CNC machining system 102 performs the machining by moving a machining tool 104 or part 20 in relation to each other in three dimensional space in order to perform an operation on the part 20. The CNC machining system 102 performs the machining according to CNC commands generated by a CNC controller 106. The CNC commands are indicative of what tool paths the machining tool 104 should take and sets various machining conditions such as the feed, or speed the tool cuts into the part, and spindle speed, or the speed with which the machining tool 104 rotates when cutting the part 20. The CNC machining system 102 can be of the milling type or of the turning type. For instance, milling is performed by a milling machine, and involves positioning a non-rotating part underneath a spindle, which removes material using a sharp, rotating cutter, called an end mill bit. Turning is performed by a lathe 108, and involves spinning a rounded aircraft part 20 in a machine spindle and cutting the aircraft part 20 using a non-rotating tool bit. The CNC machining system 102 shown in FIG. 2 is of the turning type. However, it is intended that the system 100 can be part of CNC machining systems of the milling type and/or any other suitable machining systems.

Figure 3:
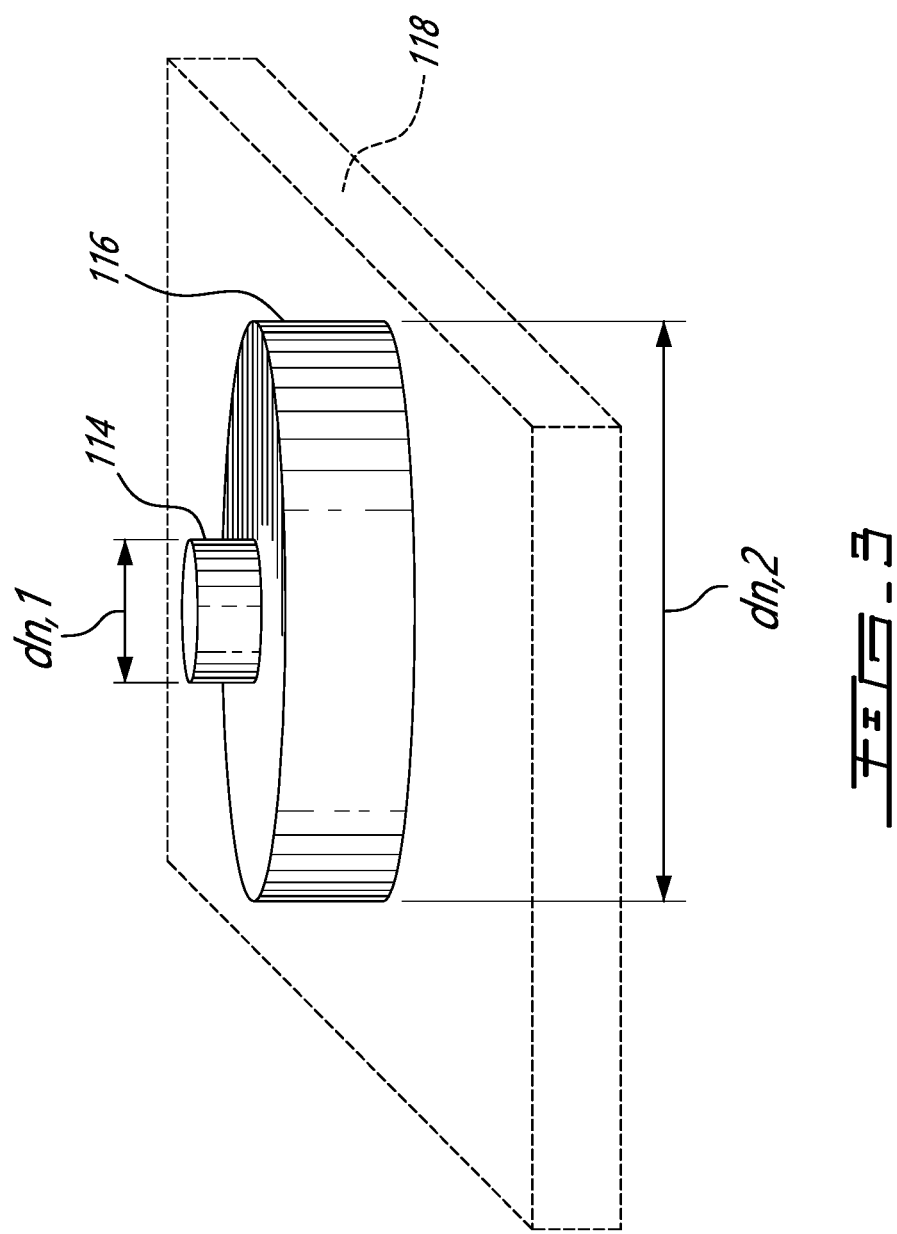
FIG. 3 is an oblique view of exemplary first and second reference gauges, in accordance with one or more embodiments.

The manufacturing system 100 has a receiving area 110 which receives the aircraft part 20, a first reference gauge and a second reference gauge. In this specific embodiment, the receiving area 110 can partially or wholly correspond to a machining area 112 of the CNC machining system 102. FIG. 3 shows examples of such first and second reference gauges 114 and 116. As shown, the first reference gauge 114 has a first nominal dimension dn,1 and the second reference gauge 116 has a second nominal dimension dn,2 different from the first nominal dimension dn,1, i.e., dn,1≠dn,2. The shape of the first and second reference gauges 114 and 116 can vary. As such, the first and second nominal dimensions dn,1 and dn,2 can be provided in the form of diameters (as shown), lengths and any other suitable type of dimensions. In some embodiments, the first and second reference gauges 114 and 116 are separate from one another. However, in some other embodiments, the first and second reference gauges 114 and 116 can be made integral to one another. In these embodiments, the first and second reference gauges 114 and 116 can protrude from a common body 118.

Referring back to FIG. 2, the manufacturing system 100 has a measurement device 120 which is configured to measure dimensions of the aircraft part 20, the first reference gauge 114 and the second reference gauge 116 within the receiving area. These dimensions ("the measured dimensions" hereinafter) can be measured prior, during and/or after the machining process. The measurements can be performed simultaneously or sequentially, depending on the embodiment. As the aircraft part 20, the first reference gauge 114 and the second reference gauge 116 are subjected to common environmental conditions within the receiving area 110, any environmental change such as temperature variations and humidity variations can cause measurement and/or machining errors. Accordingly, it was found that by calibrating the manufacturing system 100 prior, during and/or after the machining process, at least a portion of these measurements and/or machining errors can be reduced.

In some embodiments, the measurement device 120 is provided in the form of a measurement probe 122 which is permanently disposed within a housing 124 of the CNC machining system 102. In some other embodiments, the measurement device 120 can be provided in the form of a measurement probe 122 which is removably mountable within the housing 124 of the CNC machining system 102. For instance, the machining tool 104, e.g., the rotating end mill and/or non-rotating tool bit, can be removed and replaced with the measurement device 120, as schematically illustrated per the bold arrows. In some other embodiments, the measurement device 120 measures the geometry and/or the coordinates of the aircraft part 20 or reference gauges 114 and 116 by sensing discrete points on their respective surfaces with the measurement probe 122. Various types of measurement probes 122 can be used including, but not limited to, mechanical probe(s), optical probe(s) such as laser probe(s) or white light probe(s), electromechanical probe(s) such as atomic force microscopy, and any other measurement probes. In some embodiments, the measurement device 120 can be part of a coordinate measurement machine (CMM) 124. In these embodiments, the CNC machining system 102 may be omitted.

In some embodiments, the manufacturing system 100 has one or more articulated arms (not shown) configured to move the aircraft part 20 and the reference gauges 114 and 116 to and from the receiving area 110. In some embodiments, once the manufacturing system 100 is properly calibrated, the articulated arm(s) can remove the measurement probe 122 from the CNC machining machine 102 and to install the machining tool 104 to the CNC machining machine 102, and vice-versa. Then, the aircraft part 20 can be machined based in accordance with further specifications. Additionally or alternately, the articulated arm(s) can be configured for positioning the first and second reference gauges 114 and 116 within the receiving area 110 prior to the measurement of the first and second reference gauges 114 and 116. Then, the articulated arm(s) can remove the first and second reference gauges 114 and 116 from the receiving area 110 and position the aircraft part 20 within the receiving area 110 for subsequent measurement and/or machining. As such, the first and second reference gauges 114 and 116 may be measured within the receiving area 110 without the presence of the aircraft part 20, and vice versa. In the latter embodiments, the first and second reference gauges 114 and 116 may be subjected to similar environmental conditions to the aircraft part 20 as long as the steps are performed within a satisfactory time window (e.g., within the same minute, hour, day).

As depicted, the manufacturing system 100 has a manufacturing controller 126 which is communicatively coupled to the measurement device 120. The communicative coupling between the manufacturing controller 126 and the measurement device 120 can be a wired link, a wireless link, or a combination of both. In some embodiments, the manufacturing controller 126 can correspond to the CNC controller 106 of the CNC machining system 102. However, in some other embodiments, the manufacturing controller 126 of the manufacturing system 100 can be a standalone controller. As described below, the manufacturing controller 126 can calibrate the CNC machining system 102 on the go based on measurements taken by the measurement device 120 during the machining process. The manufacturing controller 126 is configured to, based on a difference between the measured dimensions d1 and d2 of the first and second reference gauges 114 and 116 and theirs respective nominal dimensions d,n1 and dn,2, determine a calibration curve which can be used to construct a machine-readable dataset representative of the aircraft part 20, including a step of modifying any measured dimensions of the aircraft part 20 based on the calibration curve.

The manufacturing controller 126 can be provided as a combination of hardware and software components. The hardware components can be implemented in the form of a computing device 400, an example of which is described with reference to FIG. 4. Moreover, the software components of the manufacturing controller 126 can be implemented in the form of a software application 500, an example of which is described with reference to FIG. 500.

Figure 4:
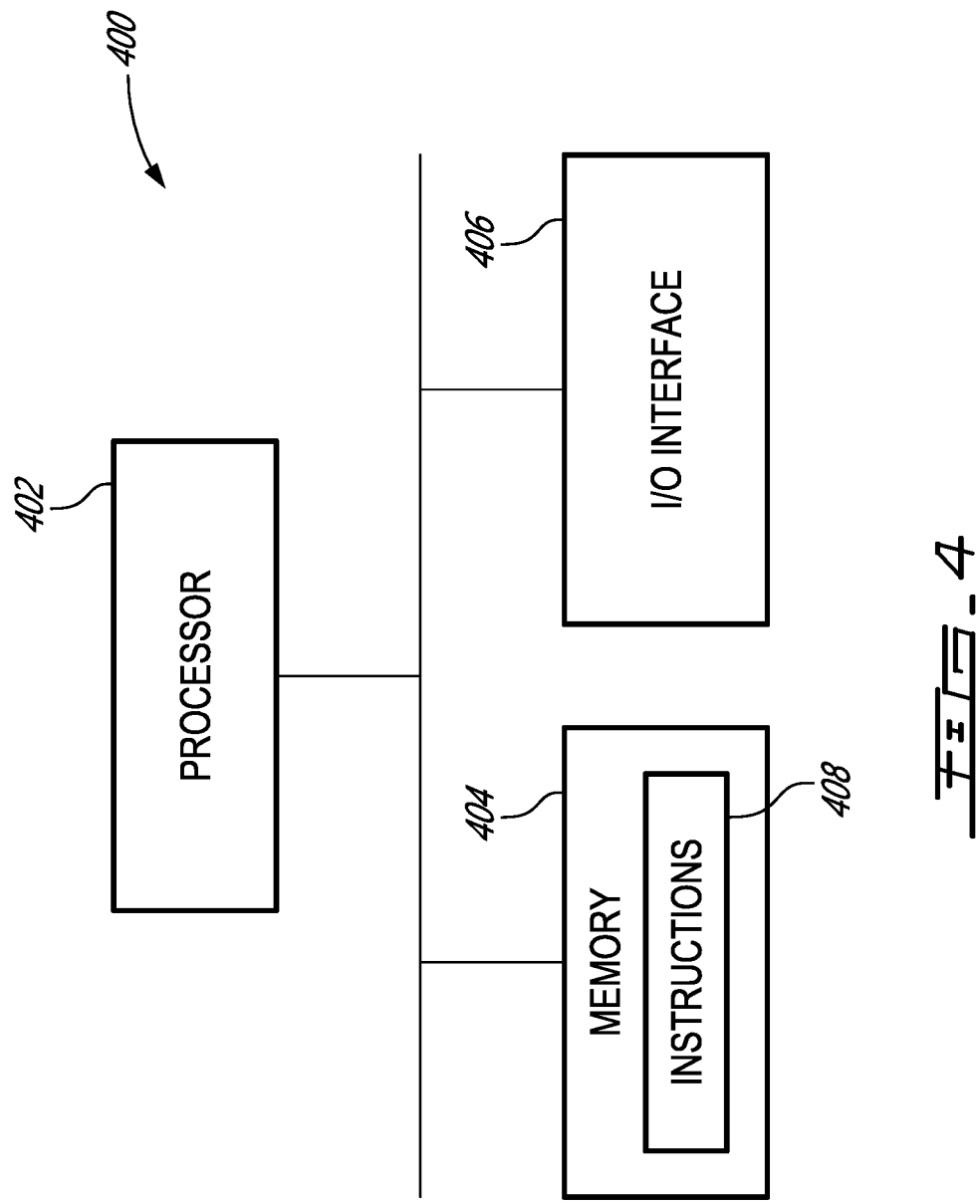
FIG. 4 is a schematic view of an example of a computing device of the controller of FIG. 2, in accordance with one or more embodiments.

Referring to FIG. 4, the computing device 400 can have a processor 402, a memory 404, and I/O interface 406. Instructions 408 for calibrating the measurement device can be stored on the memory 404 and accessible by the processor 402.

The processor 402 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 404 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 406 enables the computing device 400 to interconnect with one or more input devices, such as a mouse, a keyboard, a measurement device and/or a CNC controller, or with one or more output devices such as a display, a memory system and/or a remote network.

Each I/O interface 406 enables the manufacturing controller 126 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 5:
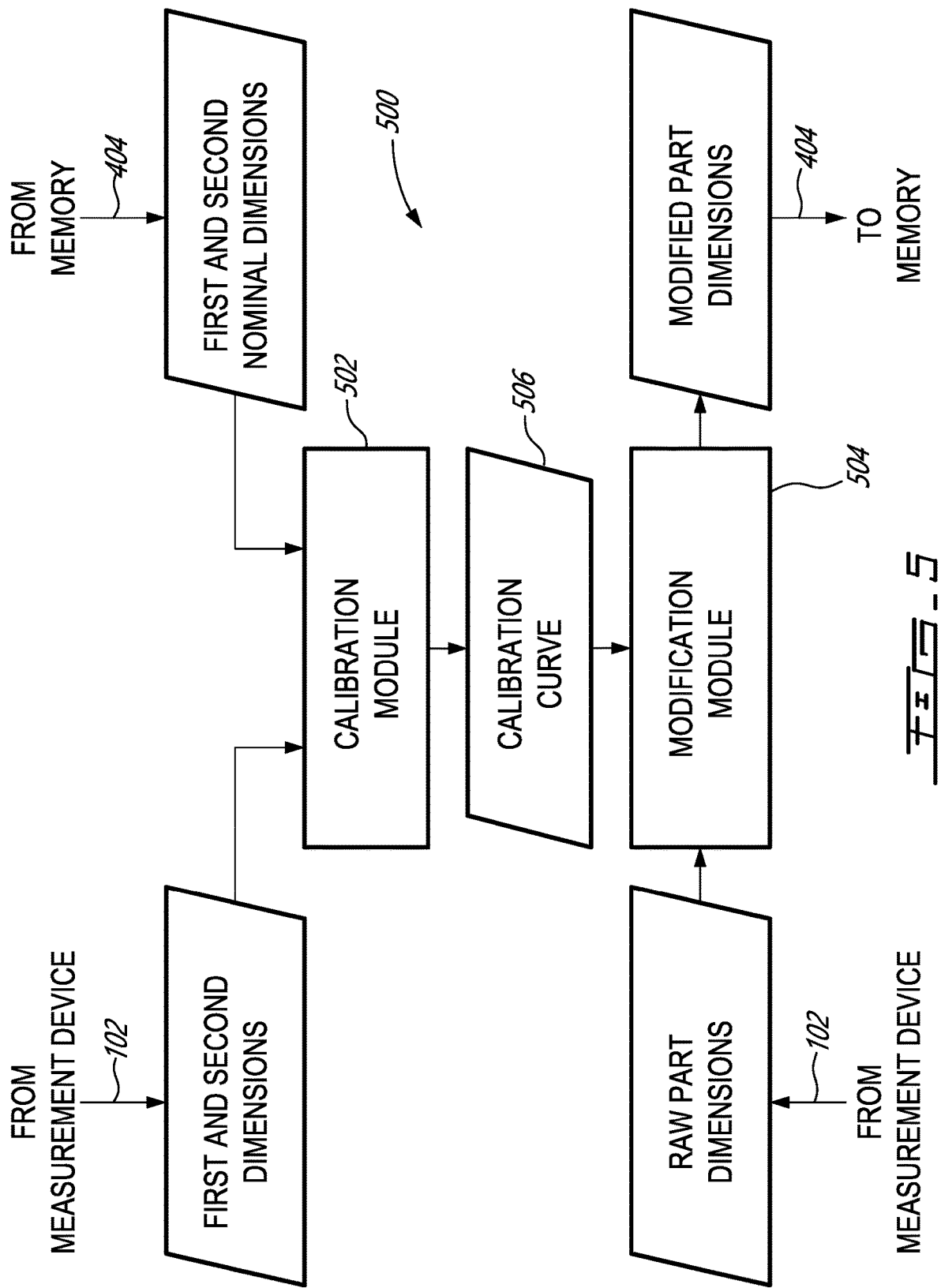
FIG. 5 is a block diagram of an example of a software application of the controller of FIG. 2, in accordance with one or more embodiments.

Referring now to FIG. 5, the software application 500 is configured to receive the measured dimensions from the measurement device 102, to determine the calibration curve and to modify raw part dimensions to obtain modified part dimensions. In some embodiments, the software application 500 is stored on the memory 404 and accessible by the processor 402 of the computing device 400.

As shown, the software application 500 has a calibration module 502 which is communicatively coupled to the measurement device 102 via the I/O interface 406 of the computing device 400, for instance. More specifically, the calibration module 502 receives dimensions d1 and d2 corresponding to measurements of the first and second reference gauges, respectively, by the measurement device 102. The measured dimensions d1 and d2 can be received directly from the measurement device 102 in some embodiments. In other embodiments, the measured dimensions d1 and d2 can be received from a memory 404. The calibration module 502 also receives first and second nominal dimensions dn,1 and dn,2. The calibration module 502 may retrieve the first and second nominal dimensions dn,1 and dn,2 from the memory 404 of the computing device 400 or from any other suitable memory system and/or network.

Upon reception of the dimensions d1, d2, dn,1 and dn,2, the calibration module 502 determines a calibration curve 506 by performing a mathematical fit. As such, the calibration curve 506 can be a linear or non-linear calibration curve. For instance, the calibration curve may be polynomial curves of the first degree, the second degree or more.

In the case a linear curve fitting on the basis of the data points (d1, dn,1) and (d2, dn2), the linear calibration curve $d_{m,i}$ can be given by an equation equivalent to the following equation:

$$d_{m,i}(d_i) = \left(\frac{d_{n,2} - d_{n,1}}{d_2 - d_1}\right)d_i + d_0, \qquad (1)$$

where the indicia m denotes modified dimensions, the indicia i denotes the raw measured part dimensions, the term $$\left(\frac{d_{n,2} - d_{n,1}}{d_2 - d_1}\right)$$

denotes a slope at which the modified dimensions increase with increasing measured part dimensions and $d_0$ denotes the intercept of the linear calibration curve $d_{m,i}$. In some embodiments, the intercept $d_0$ is null as a null measured dimension should result in a null modified dimension as well. The intercept $d_0$ can be resolved by inputting $d_i$ as $d_1$ or $d_2$, in some embodiments. The intercept $d_0$ may not be a negligible value. As such, the modification module 504 can modify a raw part dimension $d_i$ by inputting the raw part dimension $d_i$ into the linear calibration curve $d_{m,i}$. In some embodiments, the modification module 504 can thereby interpolate or extrapolate the modified dimensions $d_{m,i}$ on the basis of the data points (d1, dn,1) and (d2, dn2) alone, which may involve linear fit calculations as well. The determination of the modified dimensions can be part of a broader step of constructing a machine-readable dataset indicative of the aircraft part 20. As such, the machine-readable dataset can be provided in the form of three-dimensional coordinates of the aircraft part 20 as calibrated using the software application 500, in some embodiments. Additionally or alternatively, the machine-readable dataset can include of a set of instructions useable to further machine the aircraft part 20 according to the desired specifications.

The computing device 400 and the software application 500 described above are meant to be examples only. Other suitable embodiments of the manufacturing controller 126 can also be provided, as it will be apparent to the skilled reader.

Figure 6:
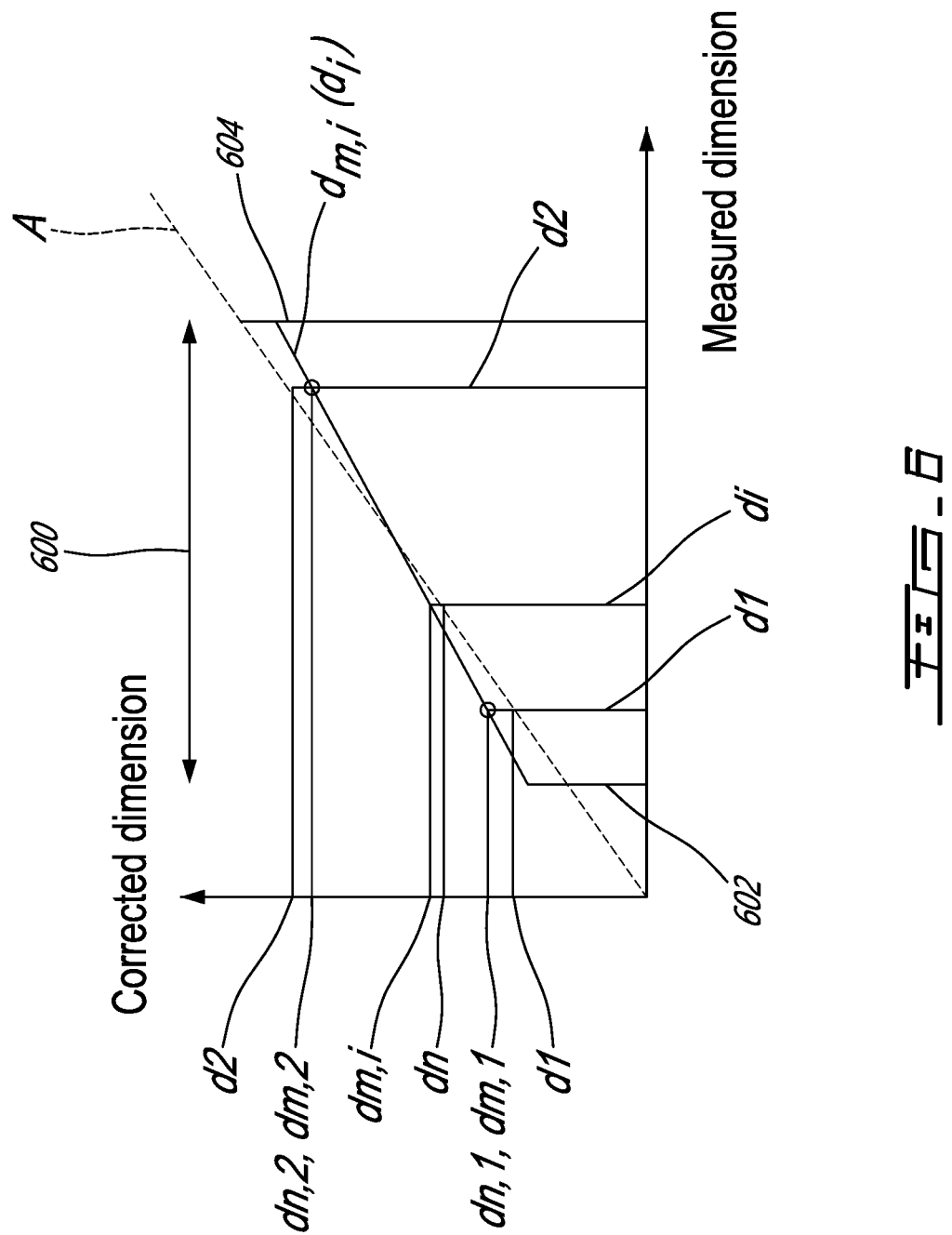
FIG. 6 is a graph of a linear calibration curve representing modified part dimensions as a function of measured part dimensions, in accordance with one or more embodiments.

Reference is now made to FIG. 6, which illustrates an example of a linear calibration curve $d_{m,i}(d_i)$. While curve A shows a linear curve showing the relationship between modified and raw part dimensions when the error values are null across a measurement range 600, the linear calibration curve $d_{m,i}(d_i)$ emphasizes the difference between measured and modified dimensions di and dm,i. More specifically, the measurement range 600 has a lower limit 602, below which measurements cannot be made, and an upper limit 604, above which measurements cannot be made. In this case, the first nominal dimension dn,1 is proximate to the lower limit 602 of the measurement dimension range 600 whereas the second nominal dimension dn,2 is proximate to the upper limit 604 of the measurement dimension range 600. For instance, the first and second nominal dimensions dn,1 and dn,2 can be about 4 inches and 16 inches, respectively, in embodiments where the CNC machining system has a machining dimension range extending between 4 and 16 inches. Each manufacturing system and/or associated CNC machining system has a respective measuring and/or machining dimension range within which they can measure and/or machine parts. These dimension ranges can vary from one embodiment to another.

Another example of linear curve fitting includes the calculation of a first error value e1 between the first nominal dimension dn,1 and the measured dimension d1 of the first reference gauge 114. A second error value e2 is also calculated between the second nominal dimension dn,2 and the measured dimension d2 of the second reference gauge 116. For instance, the first and second error values e1 and e2 may be calculated using an equation equivalent to the following equation:

$$e_i = \frac{d_{n,i} - d_i}{d_i} \times 100, \quad (2)$$

with i denoting an integer representing either 1 or 2 in this case. Based on the first and second error values e1 and e2, the calibration module determines a calibration curve which is communicated to a modification module. In some embodiments, the calibration curve may be determined by performing a linear fit on the basis of the first and second error values e1 and e2 and the first and second nominal dimensions dn,1 and dn,2. For instance, the linearly fitted calibration curve $e(d_i)$ can be given by an equation equivalent to the following equation:

$$e(d_i) = \left(\frac{e_2 - e_1}{d_2 - d_1}\right) d_i + e_0, \quad (3)$$

where $$\left(\frac{e_2 - e_1}{d_2 - d_1}\right)$$

denotes a slope at which me error values increase with increasing part dimensions and $e_0$ denotes the intercept of the linear curve. In some embodiments, the intercept $e_0$ is null or relatively small as a null or relatively small error value is expected at null or relatively small dimensions. As such, the modification module can modify a raw part dimension $d_i$ by calculating the expected error value $e(d_i)$ and applying the expected error value $e(d_i)$ from the raw part dimension $d_i$ according to an equation equivalent to the following equation:

$$d_{m,i} = d_i(1 + e(d_i)), \quad (4)$$

wherein $d_{m,i}$ denotes the modified part dimension. In some embodiments, the error value can be positive or negative, thereby increasing or decreasing the raw part dimension, respectively.

Figure 7:
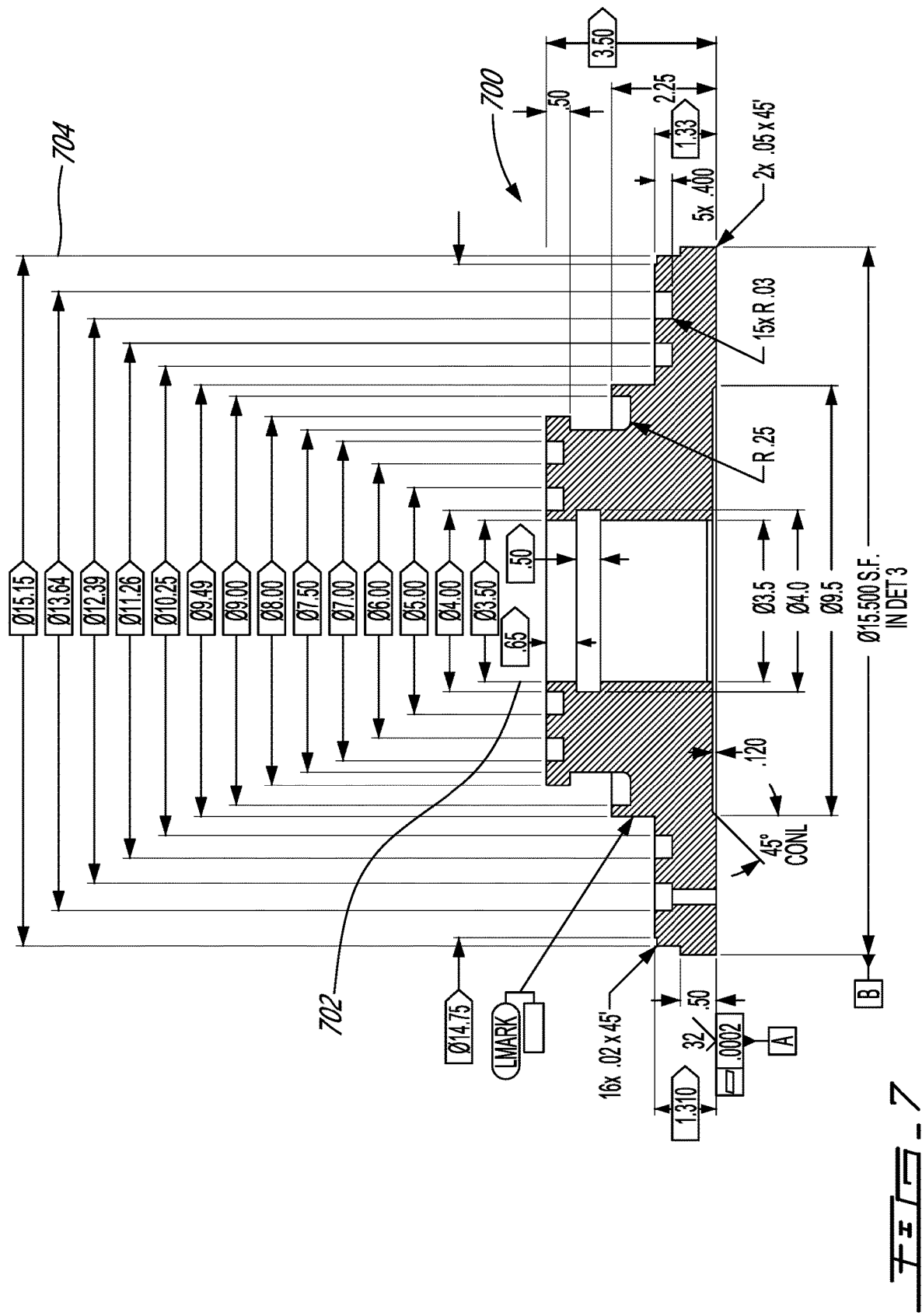
FIG. 7 is a sectional view of an example reference part having at least two reference gauges, in accordance with one or more embodiments.

To demonstrate the performance of the manufacturing system and method described herein, a reference part 700 having a plurality of reference gauges has been tested. An example of such a reference part is shown in FIG. 7. As shown, the reference part has first and the second reference gauges 702 and 704, as well as a number of additional reference gauges. Each of these reference gauges has been measured up a significant number of times using a CMM in order to define satisfactory values for the nominal dimensions associated with each reference gauge. In such an example, the calibration curve may be non-linear, especially in embodiments where more than two pairs of nominal and measured dimensions of corresponding reference gauges are used in the calibration curve determination. In these embodiments, precision of the calibration process may be increased.

Figure 8:
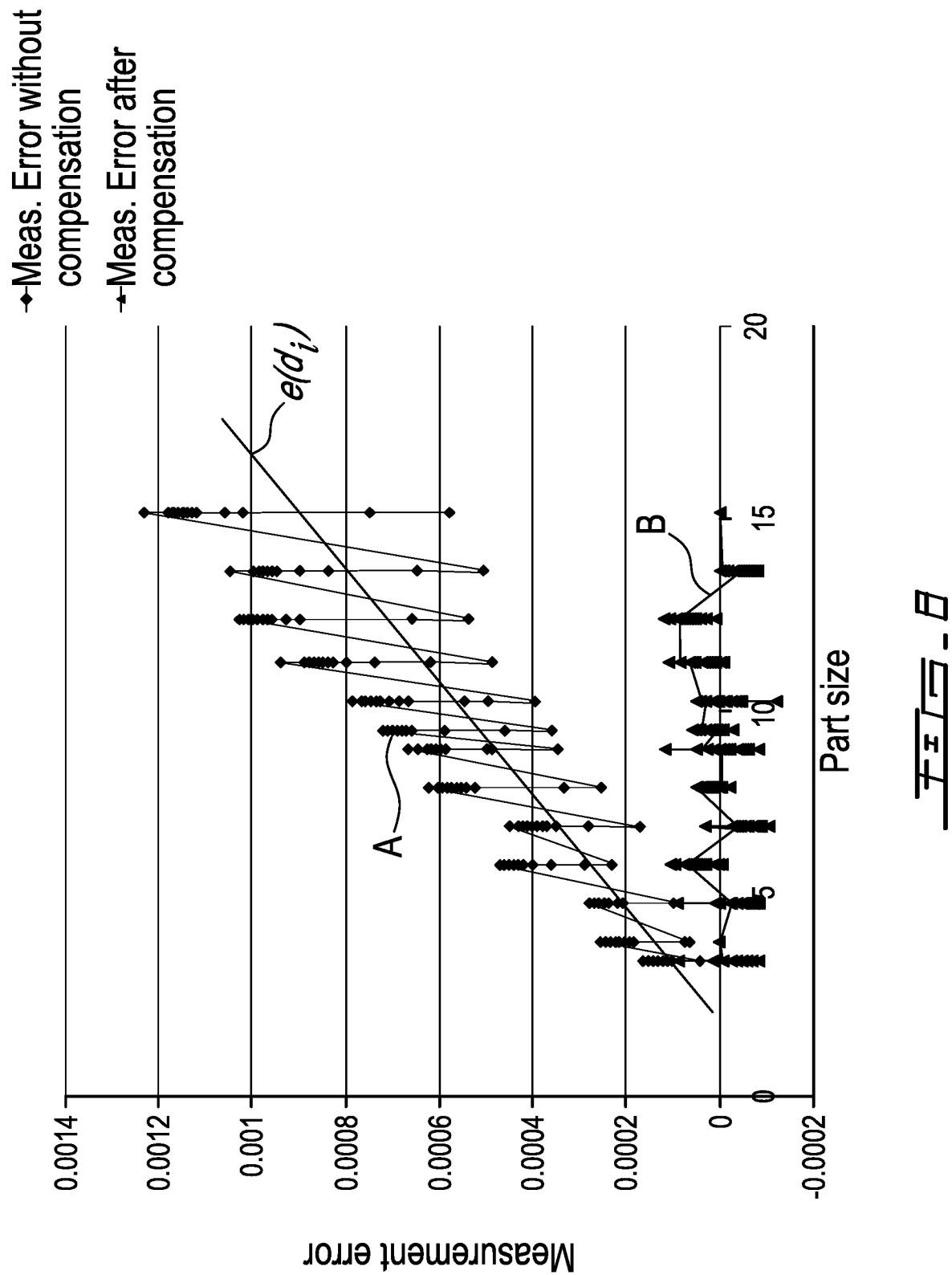
FIG. 8 is a graph of a linear calibration curve representing error values as a function of measured part dimensions, in accordance with one or more embodiments.

FIG. 8 shows a graph of the error values as a function of measured dimensions of the reference gauges of the reference part as compared to their nominal dimensions. As shown, data points A show that in this case the error values increase with the measured dimension of the part. Curve $e(d_i)$ shows an example of a linear calibration curve calculated on the basis of at least two error values and associated nominal dimensions. The result of the calibration is shown in curve B which shows the error values after the measured dimensions of the reference gauges have been modified according to the linear calibration curve $e(d_i)$. As can be appreciated, the resulting error values are reduced across the measurement range.

Figure 9:
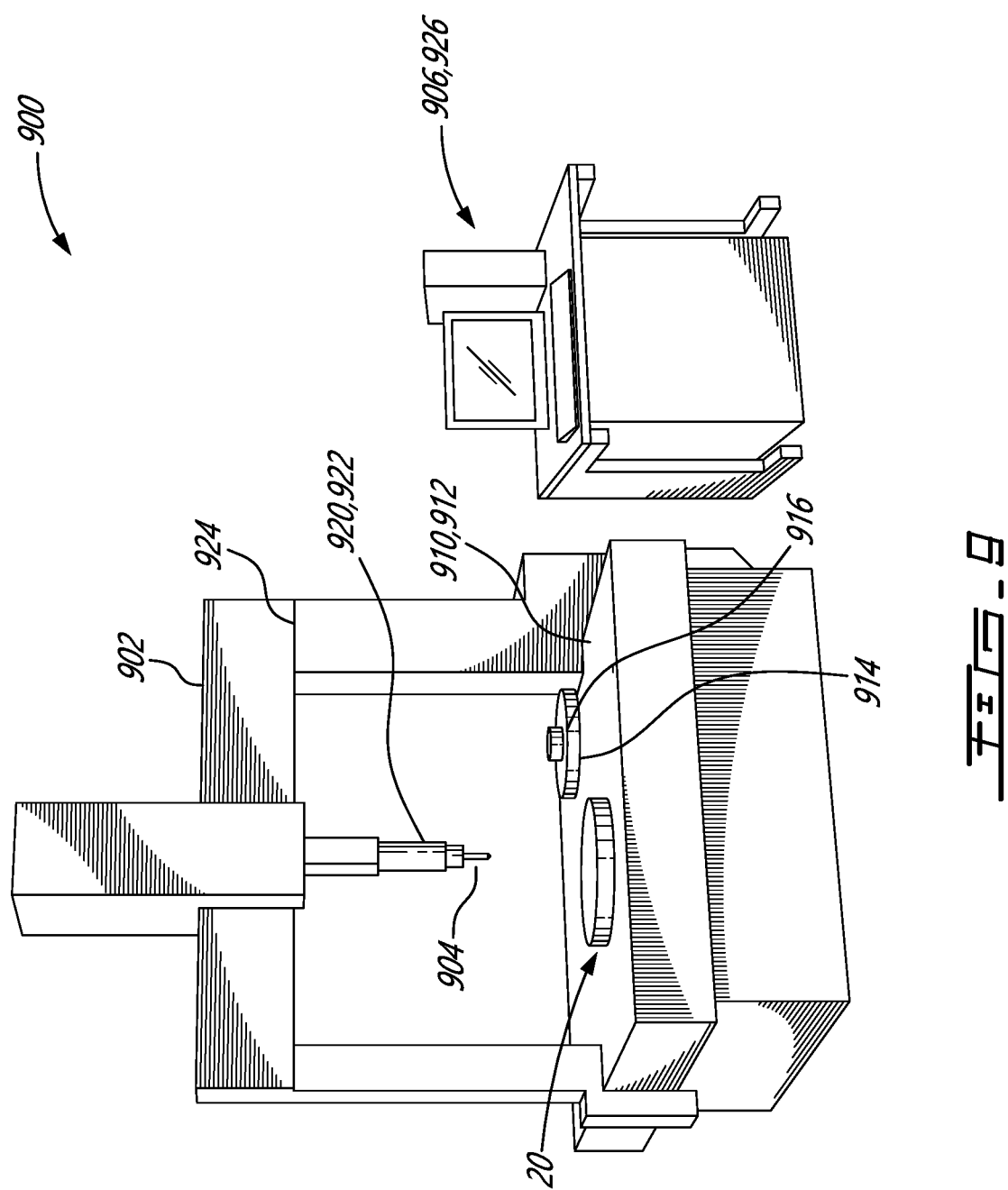
FIG. 9 is an oblique view of an example of a system for manufacturing an aircraft part, shown as part of a coordinate measurement machine, in accordance with one or more embodiments.

FIG. 9 shows an example of a manufacturing system 900 for manufacturing one or more parts 20. As shown in this example, the manufacturing system 900 is part of a coordinate measurement machine (CMM) 902. The CMM 902 performs measurements by moving a measurement probe 904 or part 20 in relation to each other in three dimensional space in order to perform one or measurements on the part 20. The CMM 902 performs the measurements according to CMM commands generated by a CMM controller 906. The CMM commands are indicative of what probe paths the measurement probe 904 should take to properly measure the features of the part 20.

As shown, the manufacturing system 900 has a receiving area 910 which receives the part 20, a first reference gauge 914 and a second reference gauge 916. In this specific embodiment, the receiving area 910 can partially or wholly correspond to a measurement area 912 of the CMM 902.

As shown, the manufacturing system 900 has a measurement device 920 which is configured to measure dimensions of the part 20, the first reference gauge 914 and the second reference gauge 916 within the receiving area 910. The measurements can be performed simultaneously or sequentially, depending on the embodiment. As the part 20, the first reference gauge 914 and the second reference gauge 916 are subjected to common environmental conditions within the receiving area 910, any environmental change such as temperature variations and humidity variations can cause measurement errors. Accordingly, it was found that by calibrating the manufacturing system 900 prior, during and/or after the measurement process, at least a portion of these measurements errors can be reduced.

In some embodiments, the measurement device 920 is provided in the form of a measurement probe 922 which is movably attached to a frame 924 of the CMM 902. In some other embodiments, the measurement device 920 measures the geometry and/or the coordinates of the part 20 or reference gauges 914 and 916 by sensing discrete points on their respective surfaces with the measurement probe 922. Various types of measurement probes 922 can be used including, but not limited to, mechanical probe(s), optical probe(s) such as laser probe(s) or white light probe(s), electromechanical probe(s) such as atomic force microscopy, and any other measurement probes.

As depicted, the manufacturing system 900 has a manufacturing controller 926 which is communicatively coupled to the measurement device 920. The communicative coupling between the manufacturing controller 926 and the measurement device 920 can be a wired link, a wireless link, or a combination of both. In some embodiments, the manufacturing controller 926 can correspond to the CMM controller 906 of the CMM 902. However, in some other embodiments, the manufacturing controller 926 of the manufacturing system 900 can be a standalone controller. As described below, the manufacturing controller 926 can calibrate the CMM 902 on the go based on measurements taken by the measurement device 920 during the measurement process. The manufacturing controller 926 is configured to, based on a difference between the measured dimensions d1 and d2 of the first and second reference gauges 914 and 916 and theirs respective nominal dimensions d,n1 and dn,2, determine a calibration curve which can be used to modify any measured dimensions of the part 20. The manufacturing controller 926 can be provided as a combination of hardware and software components such as those describe above.

FIG. 10 is a flow chart of an example of a method 1000 of manufacturing a part. The method 1000 can be performed as the part is within a receiving area, and involves interoperation between a controller and a measurement device operable to measure part(s) and gauge(s) received within the receiving area.

At step 1002, the part, a first reference gauge and a second reference gauge are subjected to common environmental conditions within the receiving area. As discussed above, the first reference gauge has a first nominal dimension dn,1 and the second reference gauge has a second nominal dimension dn,2 different from the first nominal dimension dn,1. It is noted that the part and the first and second reference gauges need not to be subjected to the common environmental conditions at the same time. For instance, the part can be subjected to first environmental conditions within the receiving area for one or more measurements. Then, the first and second reference gauges may be subjected to second environmental conditions within the receiving area for their respective measurements. In these embodiments, for error reduction to be optimal, the first and second environmental conditions are preferably similar to one another. As such, the measurements may be made using the same machine and/or within a relatively short time frame, for instance. Performing the measurements within the same minute or hour, for instance, has been found to be satisfactory.

At step 1004, the measurement device measures dimensions of the first and second reference gauges. Step 1004 can include a step of positioning the first and second reference gauges within the receiving area prior to the actual measurements. This step can be performed by one or more articulated arms. Step 1004 can include a step of communicating, by the measurement device, the measured dimensions to a controller.

At step 1006, the controller determines a calibration curve for the measurement device by performing a mathematical fit based on the first and second nominal dimensions dn,1 and dn,2 and on the measured dimensions d1 and d2 of the first and second reference gauges. Step 1006 can include a step of fetching the first and second nominal dimensions dn,1 and dn,2 from a memory system, in some embodiments, and/or from the measurement device.

In some embodiments, the calibration curve is a linear calibration curve. In some other embodiments, the calibration curve is a non-linear calibration curve. For instance, an example of a non-linear calibration curve can encompass any of the linear calibration curves described above to which a non-linear parameter (e.g., depending on the measured dimension) can be added. An example of a linear calibration curve includes a linear curve representing a plurality of modified dimensions as a function of a plurality of measured dimensions. Another example of a linear calibration curve includes a linear curve representing a plurality of error values as a function of a plurality of measured dimensions. With such calibration curves, the controller can be configured to interpolate and/or extrapolate to obtain the modified dimensions.

At step 1008, the measurement device measures one or more dimension(s) of the part. It is noted that step 1008 can be performed prior to or after said step 1004. Accordingly, these steps may be performed in the opposite order in some embodiments. Step 1008 can include a step of communicating, by the measurement device, the measured dimensions to the controller.

At step 1010, the controller constructs a machine-readable dataset representative of the part, including a step of modifying the measured dimension(s) of the part using the calibration curve. In some embodiments, the machine-readable dataset can be provided in the form of three-dimensional coordinates of the part as modified using the method 1000. In some embodiments, the machine-readable dataset can include of a set of instructions useable to further construct, modify, process and/or machine the part according to the desired specifications. In some other embodiments, the machine-readable dataset representative of the part is used to validate whether the part requires further processing, e.g., if the modified set of measured dimensions corresponds to a desired set of dimensions for the part.

Once the constructed machine-readable dataset have been obtained, the method 1000 can include a step of further machining the part based on the modified dimension(s). To do so, the method 1000 may include a step of removing a measurement probe and installing a machining tool to machine the part according to new CNC commands, for instance.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the manufacturing system can be part or made integral to a computer numerical control machining system and/or to a coordinate measurement machine. In some embodiments, the part to be manufactured need not to be an aircraft part. Indeed, any type of part can be manufactured with the methods and systems described herein. It was found particularly advantageous to use the methods and systems described herein to manufacture parts which have to meet tight tolerances. Yet further modifications could be implemented by a person of ordinary skill in the art in view of the present disclosure, which modifications would be within the scope of the present technology.

The invention claimed is:

1. A system for manufacturing a part, the system comprising:
   a receiving area receiving said part, a first reference gauge and a second reference gauge and subjected to common environmental conditions, said first reference gauge having a first nominal dimension and said second reference gauge having a second nominal dimension different from said first nominal dimension;
   a measurement device operable to measure dimensions of said first and second reference gauges, and of said part; and
   a controller communicatively coupled to said measurement device, said controller having a processor and a non-transitory memory communicatively coupled to said processor and having stored thereon instructions that when executed by said processor while said part is received in said receiving area cause said controller and said measurement device to interoperate to:
- determine, by said measurement device, said dimensions of said first and second reference gauges, and of said part;
- determine, by said controller based on said dimensions of said first and second reference gauges, and of said first and second nominal dimensions, a calibration curve by performing a mathematical fit based on said first and second nominal dimensions and said measured dimensions of said first and second reference gauges; and
- construct, by said controller in said non-transitory memory, a machine-readable dataset representative of said part, including modifying, by said controller, said measured dimensions of said part based on said calibration curve.

2. The system of claim 1 wherein said measurement device is part of a computer numerical control (CNC) machining machine, said CNC machining machine machining said part based on said machine-readable dataset.

3. The system of claim 2 further comprising an articulated arm removing a measurement probe from said CNC machining machine and installing a machining tool within CNC machining machine to perform said machining.

4. The system of claim 1 further comprising an articulated arm positioning said first and second reference gauges within said receiving area prior to said measuring of said first and second reference gauges, removing said first and second reference gauges from said receiving area and positioning said part within said receiving area for said measuring of said part.

5. The system of claim 1 wherein said calibration curve is a linear calibration curve.

6. The system of claim 5 wherein said linear calibration curve represents a plurality of modified dimensions as a function of a plurality of measured dimensions.

7. The system of claim 1 wherein said modify includes one of interpolating and extrapolating a modified dimension for each measured dimension of said part using said calibration curve.

8. The system of claim 1 wherein said measurement device has a measurement dimension range encompassing said first and second nominal dimensions, the first nominal dimension being proximate to a lower limit of said measurement dimension range and said second nominal dimension being proximate to an upper limit of said measurement dimension range.

9. The system of claim 1 further comprising updating said calibration curve at a given frequency.

10. The system of claim 1 wherein said measurement device is provided in the form of a coordinate measurement machine.

11. A method of manufacturing a part, the method comprising:
- subjecting said part, a first reference gauge and a second reference gauge to common environmental conditions within a receiving area, said first reference gauge having a first nominal dimension and said second reference gauge having a second nominal dimension different from said first nominal dimension;
- using a measurement device, measuring dimensions of said first and second reference gauges, and measuring dimensions of said part; and
- using a controller communicatively coupled to said measurement device, receiving, from said measurement device, said measured dimensions of said part and of said first and second reference gauges, determining a calibration curve by performing a mathematical fit based on said first and second nominal dimensions and said measured dimensions of said first and second reference gauges; and constructing a machine-readable dataset representative of said part, including modifying said measured dimensions of said part based on said calibration curve.

12. The method of claim 11 further comprising machining said part based on said machine-readable dataset representative of said part.

13. The method of claim 11 wherein said calibration curve represents a plurality of modified dimensions as a function of a plurality of measured dimensions.

14. The method of claim 11 wherein said modifying includes one of interpolating and extrapolating a modified dimension for each measured dimension of said part using said calibration curve.

15. The method of claim 11 wherein said measurement device has a measurement dimension range encompassing said first and second nominal dimensions, the first nominal dimension being proximate to a lower limit of said measurement dimension range and said second nominal dimension being proximate to an upper limit of said measurement dimension range.

16. The method of claim 11 wherein said subjecting includes sequentially receiving said first and second reference gauges within said receiving area, measuring said dimensions of said first and second reference gauges, removing said first and second reference gauges from said receiving area, receiving said part within said measuring area and measuring said dimensions of said part.

17. The method of claim 11 further comprising updating said calibration curve at a given frequency.

18. The method of claim 11 wherein said measurement device is part of a computer numerical control (CNC) machining machine, said measuring including removing a machining tool of said CNC machining machine and installing a measurement probe within said CNC machining machine.

19. The method of claim 18 further comprising removing said measurement probe, installing said machining tool, and machining said part based on said modified dimensions.

20. The method of claim 11 wherein said measurement device is provided in the form of a coordinate measurement machine.

* * * * *